(12) United States Patent
Polzin

(10) Patent No.: US 7,870,781 B2
(45) Date of Patent: Jan. 18, 2011

(54) METHOD FOR MONITORING THE TIRE CONDITION IN VEHICLES

(75) Inventor: Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 359 days.

(21) Appl. No.: 12/150,880

(22) Filed: Apr. 30, 2008

(65) Prior Publication Data

US 2008/0276700 A1    Nov. 13, 2008

(30) Foreign Application Priority Data

May 10, 2007    (DE) .................... 10 2007 021 918

(51) Int. Cl.
*B60C 23/02*    (2006.01)

(52) U.S. Cl. ........................ 73/146.3; 73/146

(58) Field of Classification Search ............ None
See application file for complete search history.

(56) References Cited

U.S. PATENT DOCUMENTS

| 6,561,017 B1* | 5/2003 | Claussen et al. ............ 73/146 |
| 6,943,673 B2* | 9/2005 | Skoff et al. ................ 340/442 |
| 7,657,393 B2* | 2/2010 | Djama ........................ 702/140 |
| 7,747,367 B2* | 6/2010 | Ono ............................ 701/38 |

FOREIGN PATENT DOCUMENTS

DE    103 03 492    10/2003

* cited by examiner

*Primary Examiner*—Lisa M Caputo
*Assistant Examiner*—Jermaine Jenkins
(74) *Attorney, Agent, or Firm*—Kenyon & Kenyon LLP

(57) ABSTRACT

In a method for monitoring the tire condition in a vehicle, the vertical acceleration is measured at one axle of the vehicle, a reference stiffness value is determined from the vertical acceleration, and a tire pressure is assigned to the reference stiffness value. In the case of a detected tire pressure loss, the tire pressure is assigned to the tire of the wheel having the pressure loss.

20 Claims, 1 Drawing Sheet

METHOD FOR MONITORING THE TIRE CONDITION IN VEHICLES

BACKGROUND OF THE INVENTION

1. Field of the Invention

The present invention relates to a method for monitoring the tire condition in vehicles.

2. Description of Related Art

In order to monitor tire condition, it is known from published German patent document DE 103 03 492 that one may record the rotational wheel speeds of the driven wheels of a motor vehicle, a tire pressure loss being present in a wheel if this wheel has a deviating wheel speed over a longer time period. This is based on the knowledge that flattened tires have a higher rotational speed. For the improvement of the results and the more certain recognition of a tire pressure loss, additional information may go into the pressure loss detection, especially the drive torque.

BRIEF SUMMARY OF THE INVENTION

An object of the present invention is preventing critical driving conditions resulting from tire pressure loss, which tire condition is detected using simply executed measures.

In the method according to the present invention, for monitoring the tire condition in vehicles, the tire-tread circumference of the wheels, which is made the basis for detecting tire pressure losses, is determined as the vehicle parameter. A pressure loss is present if the change in the tire-tread circumference of a wheel exceeds a boundary value.

In order to be able to establish the absolute pressure of a tire encumbered with a pressure loss, the vertical acceleration is measured at one axle of the vehicle in accordance with the present invention, an associated tire stiffness value being ascertained from the vertical acceleration, to which a tire pressure is assigned. In response to roadway excitations, since the wheel and the axle react as a spring-mass system, and the spring constant of the tire is established by the tire stiffness, then if the vertical acceleration is known, a tire stiffness value may be ascertained by calculation. The inner tire pressure may be shown as a function of the tire stiffness, so that ultimately a tire's inner pressure value is able to be determined from the measurement of the vertical acceleration. That being the case, a reference of the tire encumbered with pressure loss to an absolute pressure value becomes possible.

In this instance, the concept of tire stiffness characterizes the spring properties and the damping properties of the tire, that is, the tire stiffness represents a measure of the deformation of the tire as a function of the force acting upon it.

According to one example embodiment, the vertical acceleration is ascertained on one side of the vehicle at one location per axle, e.g., in the lateral region of the axle at or in a wheel. In addition, the pressure loss of the wheels is determined indirectly, preferably via the determination of the current tire-tread circumference of the wheels. However, other alternatives are conceivable to achieve tire-tread circumference determination for the establishment of pressure loss. In the case of two reference wheels, upon pressure loss, tire stiffness change and tire-tread circumference change exist. For these wheels, pressure loss can then be directly detected. For these two sensorless wheels, only one tire-tread circumference determination is present. This is able to be referenced to the tire-tread circumferences of the wheels using vertical acceleration sensors. The advantage of this procedure may be seen in that, per axle, only one vertical acceleration sensor is sufficient to be able to establish the absolute pressure in a tire encumbered with a pressure loss.

At least one, but especially a plurality of reference values are expediently determined, during a preceding initialization step, in which an assigned reference tire stiffness value and a corresponding reference tire-tread circumference are assigned to a reference pressure. When there is pressure change, the changes of the tire-tread circumference and the associated change in the tire stiffness are then present as the measure for a pressure loss. As the reference pressure values, particularly a setpoint pressure, a lesser pressure, for instance, 25% below the setpoint pressure, and a minimum pressure are determined which, for safety reasons, should not be undershot. Reference tire stiffness values and reference tire-tread circumferences are assigned to each of these pressure reference values. In the determination of the current tire-tread circumferences/tire stiffnesses, reference may be made to the reference values, whereby the establishment of the setpoint state, a reduced pressure and a minimum pressure is able be carried out in absolute values.

It is basically sufficient to provide only one vertical acceleration sensor per axle. The position of this acceleration sensor is, for example, in or on a wheel in the lateral region of the axle; but positioning the vertical acceleration sensor in the middle region of the axle at a lateral distance from the wheels is also possible. Expediently, however, the position of the vertical acceleration sensors at different axles is in each case equal-sided with respect to the vehicles lateral direction, so as to be able to compensate for interference variables better.

Tire stiffness changes are advantageously calculated with the aid of frequency analysis, preferably using a Kalman filter or a Fast Fourier Transformation (FFT).

The axle-wise assignment of vertical acceleration sensors also has the advantage that different tires and different setpoint values per axle are taken into account. That being the case, the tires of one axle are independent of the tires of the other axle, and the respective absolute pressure values may be determined in an axle-specific manner. In the case of equal tires on all axles, it is fundamentally also possible to provide only one single acceleration sensor at only one of the axles for all the tires. The respective assignment to the tire encumbered with pressure loss takes place using the second measurement specific to the wheel, especially via the determination of the tire-tread circumference change of each wheel that is based on a rotational frequency or wheel speed measurement.

DETAILED DESCRIPTION OF THE INVENTION

Figure 1:
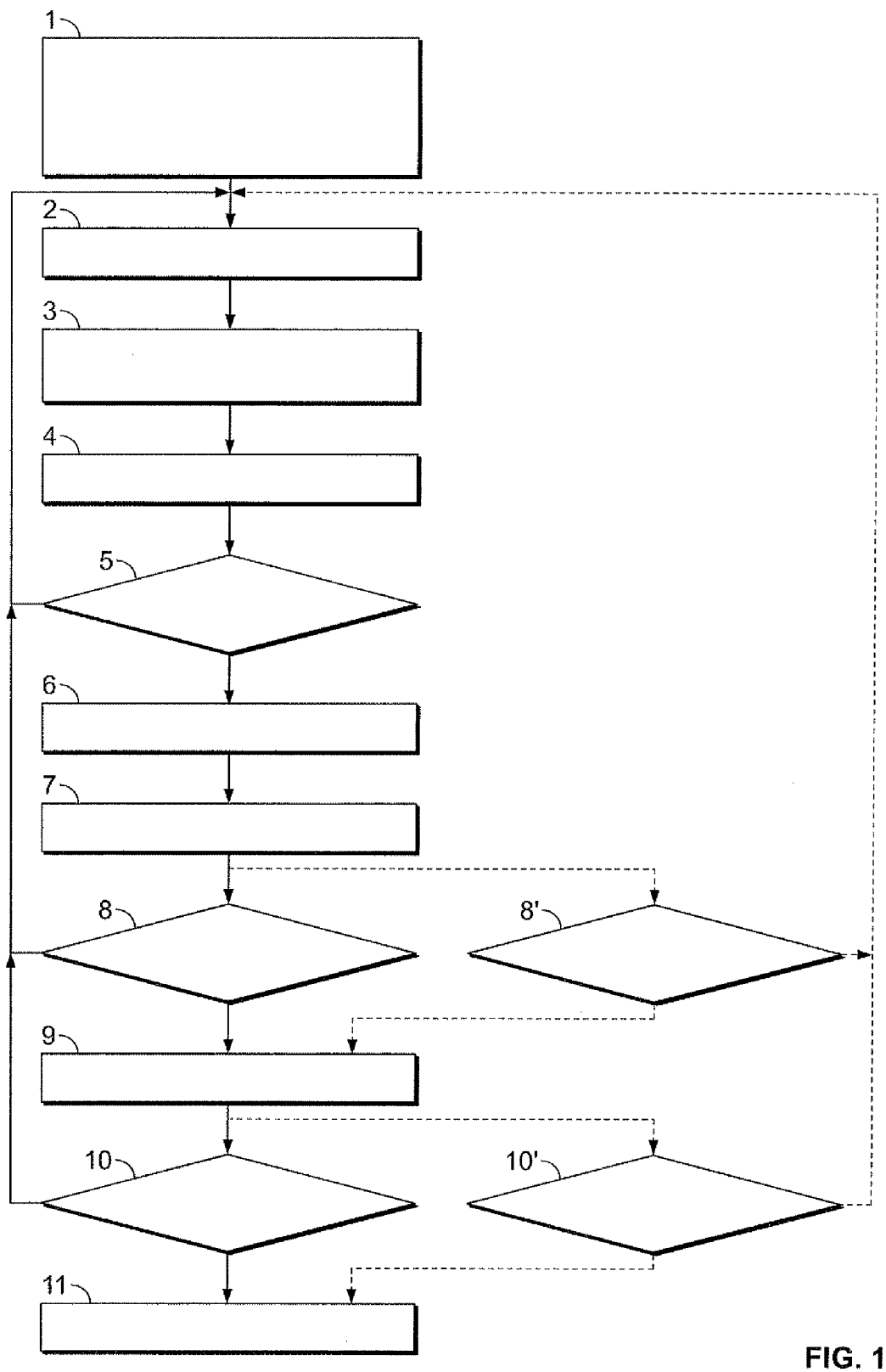
FIG. 1 is a flowchart illustrating an example method for monitoring the tire condition in vehicles.

To carry out the method according to the present invention shown in FIG. 1, it is assumed that one vertical acceleration sensor is situated per axle, adjacent to, or in a wheel. Furthermore, rotational wheel speeds $\omega_{ij}$ of all the wheels are determined.

First of all, an initialization is carried out in method step 1. To do this, one tire stiffness setpoint value $c_{setpoint}$ is determined per acceleration sensor at pressure setpoint value $P_{setpoint}$ of the tires of the respective axle, and at all four wheels an assigned tire-tread circumference setpoint value $A_{setpoint}$ is determined. This determination takes place particularly via a reference measurement of the vertical acceleration per axle in intact tires which are filled to a setpoint pressure $P_{setpoint}$. As further reference values, at a so-called reduced pressure $P_{red}$ which, for example, is 25% below setpoint pressure $P_{setpoint}$, associated tire stiffness value $c_{red}$ and reduced tire-tread circumference $A_{red}$ are determined. As the third reference value, in response to a minimum pressure $P_{min}$ of the tire, an associated tire stiffness minimum value $c_{min}$ and a tire-tread circumference minimum value $A_{min}$ are established. The initialization of these values expediently takes place before the regular driving operation is begun, and may, for instance, be established under laboratory and test conditions by the manufacturer.

The regular method sequence, which is performed at the start of the trip, begins with method step 2. In this method step, associated vertical accelerations $a_{z1}$, and $a_{z2}$ are first measured, in a manner individual to each axle, with the aid of one vertical acceleration sensor per axle, respectively. In consecutive method step 3, tire stiffnesses $c_1$ and $c_2$ are ascertained from acceleration values $a_{z1}$, and $a_{z2}$, and from this ascertainment, in each case an associated tire pressure $p_1$ and $p_2$ are ascertained. The connection between vertical accelerations $a_{z1}$, $a_{z2}$ and tire stiffnesses $c_1$ and $c_2$, on the one hand, and between the tire stiffnesses and pressure values $p_1$, $p_2$, on the other hand, is known, and exists in each case as a functional interrelationship.

In next method step 4, the rotational frequencies or rotational wheel speeds $\omega_{ij}$ are measured, and from this the tire-tread circumferences $A_{ij}$ of each individual wheel are determined. By comparing tire-tread circumferences $A_{ij}$ from successive cycles, changes in tire-tread circumferences $\alpha A_{ij}$ of each wheel are able to be established. In addition, this makes known the relationship between the four tire-tread circumferences $A_{ij}$, tire stiffnesses $c_1$ and $c_2$ and with that, tire pressure $p_1$ and $p_2$ that are calculated from the tire stiffnesses, and tire pressure $p_3$ and $p_4$ calculated from the comparison of the tire-tread circumferences.

In next method step 5, these tire-tread circumference changes $\Delta A_{ij}$ are then made the basis for a query by which it is checked whether the tire-tread circumference change exceeds an associated boundary value $\Delta A_{limit}$. This query takes place with the background that a change in the tire-tread circumference, that exceeds a certain measure, goes along with a corresponding pressure change in the respective tire. The tire-tread circumference decreases with increasing flattening of the tire.

If tire-tread circumference change $\Delta A_{ij}$ does not exceed the admissible boundary value $\Delta A_{limit}$ according to method step 5, the pressure change in the respective tire has not yet become relevant; in this case, subsequent to the "no" branching, the system returns to method step 2, and a new run through the method begins.

If the response to the query in method step 5 says that the tire-tread circumference change has exceeded the admissible measure, following the "yes" branching, the system continues to next method step 6, in which the assignment of the individual tire pressure $p_{ij}$ to the axle-specific pressure value $p_1$ and $p_2$, calculated in method step 3, is carried out, depending on whether a tire of the front axle (pressure value $p_1$) or of the rear axle (pressure value $p_2$) is involved. In next method step 7, a warning signal may be emitted, in order to point out to the driver a pressure loss in the respective tire.

In subsequent method step 8, a query is made as to whether the current pressure $p_{ij}$ that is individual to each wheel, and was ascertained in method step 6, has fallen below reduced pressure $p_{red}$. Alternatively to this query, a query on the plane of the tire-tread circumferences may also be made, which is shown in method step 8'. According to this alternative query, it is checked whether tire-tread circumference $A_{ij}$, that is individual to the wheel, is falling below a reduced tire-tread circumference $A_{red}$.

If the query in method step 8 or 8' reveals that the falling below of the respective boundary value has not yet taken place, then, following the "no" branching, the system branches back again to the beginning of the method at method step 2, in order to begin a new run through the entire method. If, however, the query reveals that the respective boundary value has already been undershot, then, after the "yes" branching the system continues to next method step 9, where a further warning signal is emitted.

In next method step 10 a further query is made to check whether the pressure value, individual to the wheel, of the tire encumbered with pressure loss, falls below a minimum pressure $P_{min}$. Alternatively to this query, according to method step 10', the query may also be made on the plane of the tire-tread circumferences, according to which it is checked whether tire-tread circumference $A_{ij}$ individual to the wheel falls below an associated tire-tread circumference minimum value $A_{min}$. If the respective boundary value has not yet been undershot, the "no" branching is subsequently returned again to the beginning of the method at method step 2. Otherwise the "yes" branching is subsequently continued to last method step 11, according to which a third warning signal is emitted.

All the warning signals that are generated in method steps 7, 9 and 11 may, additionally or alternatively, also be drawn upon internally to the vehicle, in a control unit or a regulating unit, for further processing for an indication to the driver, especially for influencing a driver assistance system such as ESP, ASR or ABS.

What is claimed is:

1. A method for monitoring a condition of a tire on a wheel of an axle of a vehicle on a road, comprising:
    measuring a vertical acceleration for the axle;
    determining a tire stiffness value from the vertical acceleration;
    determining a tire pressure based on the tire stiffness value;
    measuring a tire-tread circumference of the wheel;
    determining a change in the tire-tread circumference of the wheel; and
    if the change in the tire-tread circumference of the wheel exceeds a predetermined limit value, assigning the tire pressure to the tire of the wheel.

2. The method as recited in claim 1, wherein a reference tire stiffness value is determined based on a measurement of the vertical acceleration at at least one reference pressure, and wherein a reference tire-tread circumference is assigned to the reference tire stiffness value.

3. The method as recited in claim 2, wherein a setpoint pressure of the tire is established as a reference pressure, and wherein a tire stiffness setpoint value and a tire-tread circumference setpoint value are determined for the setpoint pressure of the tire.

4. The method as recited in claim 2, wherein a minimum pressure of the tire is established as a reference pressure, and wherein a tire stiffness minimum value and a tire-tread circumference minimum value are determined for the minimum pressure of the tire.

5. The method as recited in claim 2, wherein a reduced pressure of the tire between a setpoint pressure and a minimum pressure is established as a reference pressure, and wherein a reduced tire stiffness value and a reduced tire-tread circumference are determined for the reduced pressure of the tire.

6. The method as recited in claim 2, wherein the vertical acceleration is measured one of in or on one wheel of the axle.

7. The method as recited in claim 1, wherein only one vertical acceleration is measured per axle of the vehicle.

8. The method as recited in claim 1, wherein the vertical acceleration is measured at each axle of the wheel.

9. The method as recited in claim 8, wherein the vertical acceleration is measured at each axle of the wheel on the same side of the axles.

10. The method as recited in claim 8, wherein disturbance variables attributable to unevennesses of the road are ascertained from a displacement in time of the vertical accelerations measured at different axles.

11. The method as recited in claim 1, wherein changes in tire stiffness are calculated by a frequency analysis using one of a Kalman filter or a Fast Fourier Transformation.

12. The method as recited in claim 1, wherein:
  a setpoint pressure of the tire is established as a first reference pressure;
  a tire stiffness setpoint value and a tire-tread circumference setpoint value are determined for the first reference pressure;
  a minimum pressure of the tire is established as a second reference pressure;
  a tire stiffness minimum value and a tire-tread circumference minimum value are determined for the second reference pressure;
  a reduced pressure of the tire between a setpoint pressure and a minimum pressure is established as a third reference pressure; and
  a reduced tire stiffness value and a reduced tire-tread circumference are determined for the third reference pressure.

13. A method for monitoring a condition of a tire of a wheel of a vehicle, comprising:
  for each of two axles of the vehicle:
    measuring a respective vertical acceleration at the respective axle;
    based on the respective measured vertical acceleration for the respective axle, determining a respective tire stiffness value; and
    based on the determined tire stiffness for the respective axle, determining a respective tire pressure;
  for each of the wheels:
    successively determining a respective tire-tread circumference;
    determining whether a change in the tire-tread circumferences determined for the respective wheel in a pair of successive determinations exceeds a threshold change;
  for each of the wheels for which the respective change in the respective tire-tread circumference is determined to exceed the threshold change:
    (a) assign to the respective wheel the tire pressure determined for the axle on which the respective wheel is arranged; and
    (b) one of:
      (I):
        (i) determining whether the respective tire pressure assigned to the respective wheel is below a threshold value; and
        (ii) outputting an error signal where the respective tire pressure assigned to the respective wheel is determined to be below the threshold value; and
      (II):
        (i) determining whether the last determined respective tire-tread circumference is below a threshold value; and
        (ii) outputting an error signal where the last determined respective tire-circumference is determined to be below the threshold value.

14. The method of claim 13, wherein at least one of (a), (b)(I)(i), (b)(I)(ii), (b)(II)(i), and (b)(II)(ii) is performed only for a wheel for which the respective change in the respective tire-tread circumference is determined to exceed the threshold change.

15. The method of claim 13, further comprising:
  for each of the wheels, successively measuring a rotational speed of the respective wheel, wherein the respective successive tire-tread circumferences determined for the respective wheel are determined based on the successively measured rotational speeds of the respective wheel.

16. The method as recited in claim 13, wherein only one vertical acceleration is measured per axle of the vehicle.

17. The method as recited in claim 16, wherein the vertical acceleration is measured one of in or on one wheel of the axle.

18. The method as recited in claim 13, wherein disturbance variables attributable to unevennesses of the road are ascertained from a displacement in time of the vertical accelerations measured at different axles.

19. A control unit for monitoring a condition of a tire on a wheel of an axle of a vehicle on a road, comprising:
  a sensor for measuring a vertical acceleration for the axle;
  an arrangement for determining a tire stiffness value from the vertical acceleration;
  an arrangement for determining a tire pressure based on the tire stiffness value;
  an arrangement for measuring a tire-tread circumference of the wheel;
  an arrangement for determining a change in the tire-tread circumference of the wheel; and
  an arrangement for, if the change in the tire-tread circumference of the wheel exceeds a predetermined limit value, assigning the tire pressure to the tire of the wheel.

20. A control unit for monitoring a condition of a tire of a wheel of a vehicle, comprising:
  a vertical acceleration sensor; and
  a processing arrangement;
  wherein:
    for each of two axles of the vehicle:
      the vertical acceleration sensor is configured to measure a respective vertical acceleration at the respective axle;
      based on the respective measured vertical acceleration for the respective axle, the processing arrangement is configured to determine a respective tire stiffness value; and
      the processing arrangement is configured to, based on the determined tire stiffness for the respective axle, determine a respective tire pressure;
    for each of the wheels:
      the processing arrangement is configured to successively determine a respective tire-tread circumference;
      the processing arrangement is configured to determine whether a change in the tire-tread circumferences determined for the respective wheel in a pair of successive determinations exceeds a threshold change;

for each of the wheels for which the respective change in the respective tire-tread circumference is determined to exceed the threshold change:
  (a) the processing arrangement is configured to assign to the respective wheel the tire pressure determined for the axle on which the respective wheel is arranged; and
  (b) one of:
    (I): the processing arrangement is configured to:
      (i) determine whether the respective tire pressure assigned to the respective wheel is below a threshold value; and
      (ii) output an error signal where the respective tire pressure assigned to the respective wheel is determined to be below the threshold value; and
    (II): the processing arrangement is configured to:
      (i) determine whether the last determined respective tire-tread circumference is below a threshold value; and
      (ii) output an error signal where the last determined respective tire-circumference is determined to be below the threshold value.

* * * * *